W. V. TURNER & P. H. DONOVAN.
AUTOMATIC ELECTRIC BRAKE.
APPLICATION FILED FEB. 10, 1915.
1,228,497.
Patented June 5, 1917.
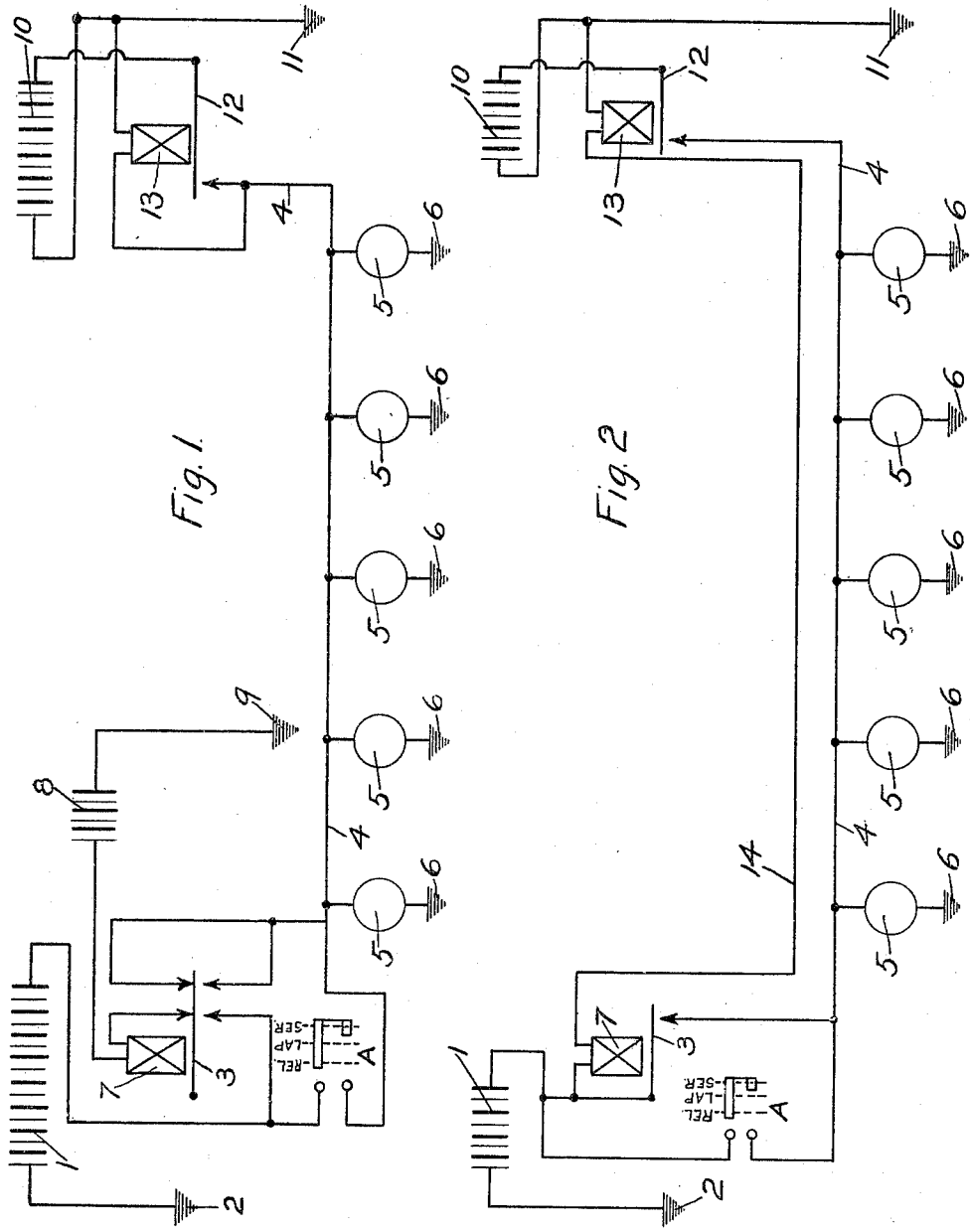

UNITED STATES PATENT OFFICE.

WALTER V. TURNER AND PATRICK H. DONOVAN, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

AUTOMATIC ELECTRIC BRAKE.

1,228,497.  Specification of Letters Patent.  Patented June 5, 1917.

Application filed February 10, 1915. Serial No. 7,419.

*To all whom it may concern:*

Be it known that we, WALTER V. TURNER and PATRICK H. DONOVAN, citizens of the United States, residents of Edgewood, in the county of Allegheny and State of Pennsylvania, have invented a new and useful Improvement in Automatic Electric Brakes, of which the following is a specification.

This invention relates to an electrically controlled brake system more particularly designed for the handling of freight trains, although adapted for other classes of service.

In the control of electric brakes, it is highly desirable to operate the brakes on a normally open circuit, in order to reduce the consumption of current to a minimum and to insure the maintenance of current strength, which will always be available when it is desired to effect an application of the brakes. An open circuit system, however, does not possess the desirable safety feature of the so-called normally closed circuit which operates to automatically effect an application of the brakes in case of a train break-in-two.

The principal object of our invention is to provide an electric brake system in which is combined the safety features of the normally closed circuit with the advantages inherent to the normally open circuit system.

Another feature of our invention is to provide an improved electric brake system in which the brakes are automatically applied on all the cars of the train upon a break-in-two.

Other objects and advantages will appear in the following more detailed description of the invention.

In the accompanying drawing, Figure 1 is a diagrammatic view of an electric brake system for a train with our improvements embodied therein, and Fig. 2 a diagrammatic view, similar to Fig. 1, but showing a slightly modified construction.

According to the construction shown in Fig. 1 of the drawing, on the head car there is provided a main source of current 1 having one terminal connected to ground 2, the other terminal being controlled by a switch 3 adapted to connect said terminal with a main train line wire 4 to which car brake application magnets 5 are connected throughout the train. Each magnet 5 has a ground connection at 6 and is adapted upon energization to effect an application of the brakes on the car.

The switch 3 is normally held open by a relay magnet 7 which is normally energized by current from an auxiliary source of current 8 having one terminal grounded at 9 and the other terminal controlled by the switch 3, so that when the switch is in its upper position the circuit of magnet 7 is closed through the main wire 4.

On the rear car there is a source of current 10 having one terminal grounded at 11, the other terminal being connected to a switch 12 which is adapted to control the connection of the source of current 10 with the main train wire 4. A relay magnet 13 when energized normally holds the switch 12 open and has one terminal connected to ground 11 and the other terminal to the main train wire 4.

In operation, the switch 3 being in its upper position, the circuit of the relay magnet 7 is closed through the main wire 4 and the consequent energization of relay magnet 7 holds the switch 3 in its upper position, so that the circuit connection of the source of current 1 to the main wire 4 is maintained open. Current from the auxiliary source 8 also flows through the main train wire 4 and energizes the rear relay magnet 13, so that the switch 12 is normally held in open position, as shown in the drawing. If the train should break in two at any point, the ground connection 11 will be disconnected from the auxiliary source of current 8, and although there will be ground connections for the auxiliary source of current through one or more of the application magnets 5, the resistance of these magnets is such that only a weak flow of current can take place which is insufficient to energize the relay magnet 7 with the power necessary to hold the switch 3 in its upper position. The switch 3 therefore drops and closes the circuit of the main source of current 1 through the main train wire 4 up to the break in the train wire, so that the application magnets 5 connected to that part of the train wire are simultaneously energized to effect an application of the brakes on the forward side of the train. The rear relay magnet 13 is also deenergized by the breaking of the main train wire 4, so that the switch 12 drops and closes the circuit from the source of current 10 through the main train wire 4 at the rear of the break. The application magnets 5 at the rear of the train break are therefore energized to effect a simultaneous application of the brakes on the cars at the rear of the break-in-two.

With this construction, before the brakes can be released and the train started, the switch 3 must be reset manually by some means, so as to again close the auxiliary circuit and open the main circuit. Such means may consist of a switch for temporarily closing the auxiliary relay circuit, or the switch itself may be mechanically operated or otherwise closed.

According to the construction shown diagrammatically in Fig. 2 of the drawing, an additional train line wire 14 is employed, and the relay magnets 7 and 13 are normally energized by current from the source of current 1, which flows from said source through the relay magnet 7, the additional train line wire 14, and the rear relay magnet 13, to the ground connection at 11.

When a break-in-two occurs, the breaking of the additional train wire 14 operates to deënergize the relay magnets 7 and 13, so that the switches 3 and 12 are allowed to drop and close the circuits of the front and rear sources of current 1 and 10 to the main train wire 4. The magnets 5 at the front and rear of the break-in-two are thus energized to effect a simultaneous application of the brakes on both sections of the train.

In ordinary service operations, the brakes are applied on the open circuit principle, that is to say, the application magnets are normally deënergized, and when it is desired to effect an application of the brakes, the magnets are energized. The open circuit switch control may be of the usual construction, such as shown diagrammatically at A in Figs. 1 and 2.

It will be understood in connection with the construction shown in Fig. 2 that although the main source of current on the head car is employed for normally energizing the relay circuit, the flow of current required for controlling the relay magnets is so slight that there is very little loss of current in normal running. However, if desired, a separate auxiliary source of current for the relay circuit may be employed in the Fig. 2 construction, as is the case in the Fig. 1 construction.

Having now described our invention, what we claim as new and desire to secure by Letters Patent, is:

1. In an electrically controlled brake, the combination with a device operated electrically for effecting an application of the brakes on a car, of a grounded train wire connected to said device, a main source of current, a grounded auxiliary source of current, and a relay normally connected through said main wire with the auxiliary source and adapted upon deënergization to connect the main source of current to said train wire.

2. In an electric brake system, the combination with means operating on a normally open circuit for controlling the brakes, of means operating on a normally closed circuit for controlling the normally open circuit and a single train wire for both circuits.

In testimony whereof we have hereunto set our hands.

WALTER V. TURNER.
PATRICK H. DONOVAN.

Witnesses:
A. M. CLEMENTS,
S. W. KEEFER.

Copies of this patent may be obtained for five cents each, by addressing the "Commissioner of Patents, Washington, D. C."